Figure 7:
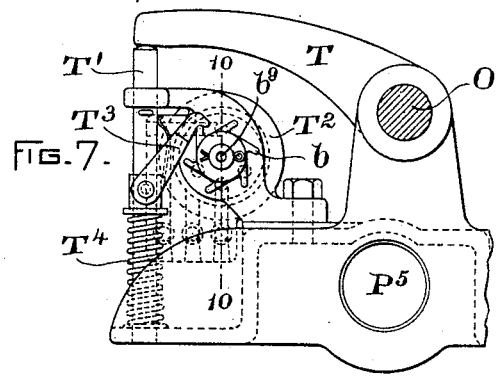

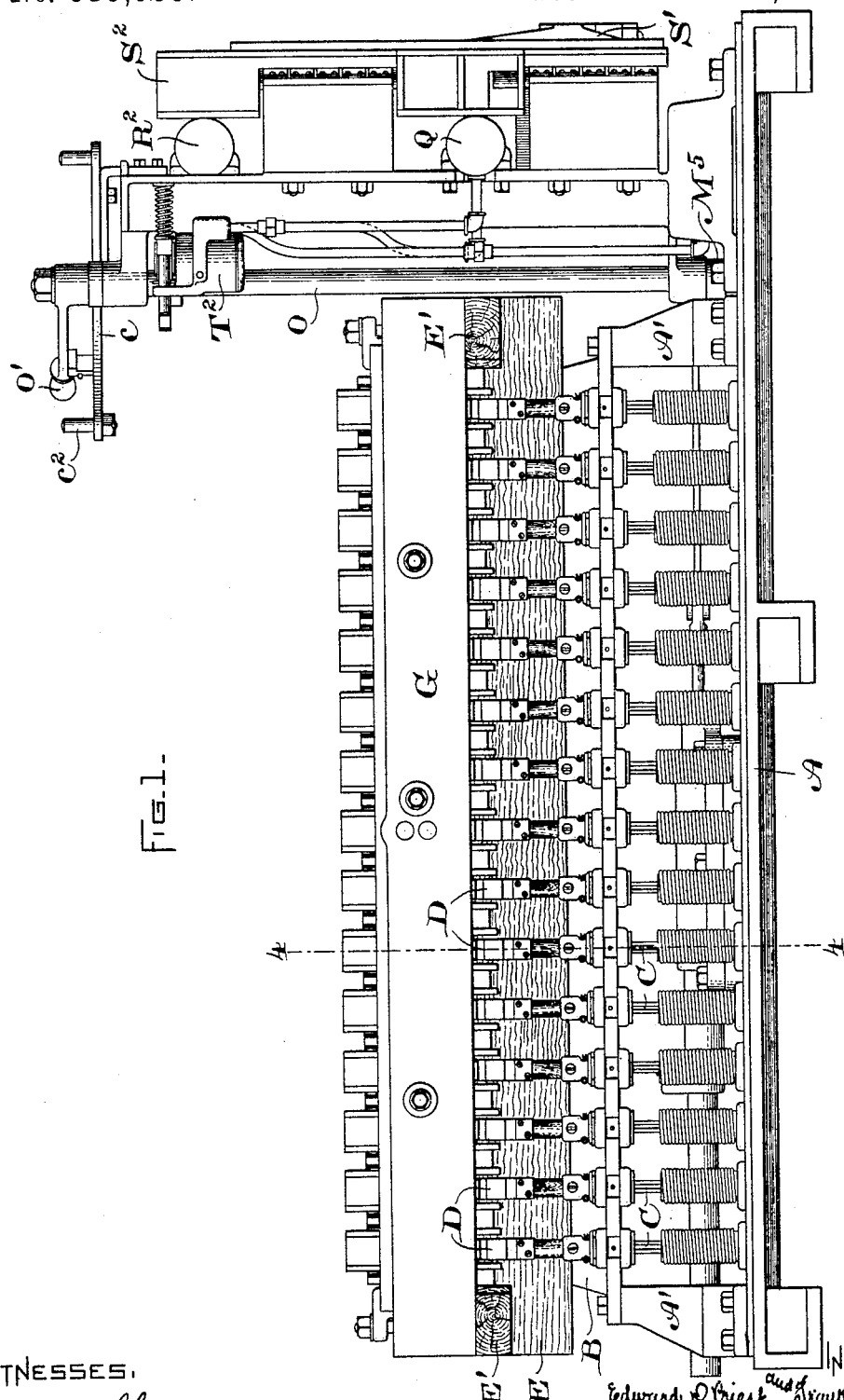

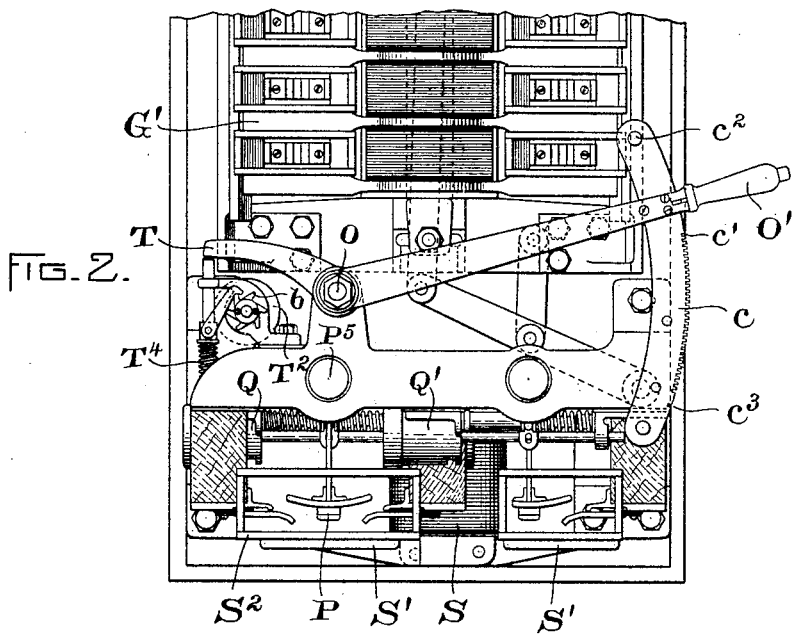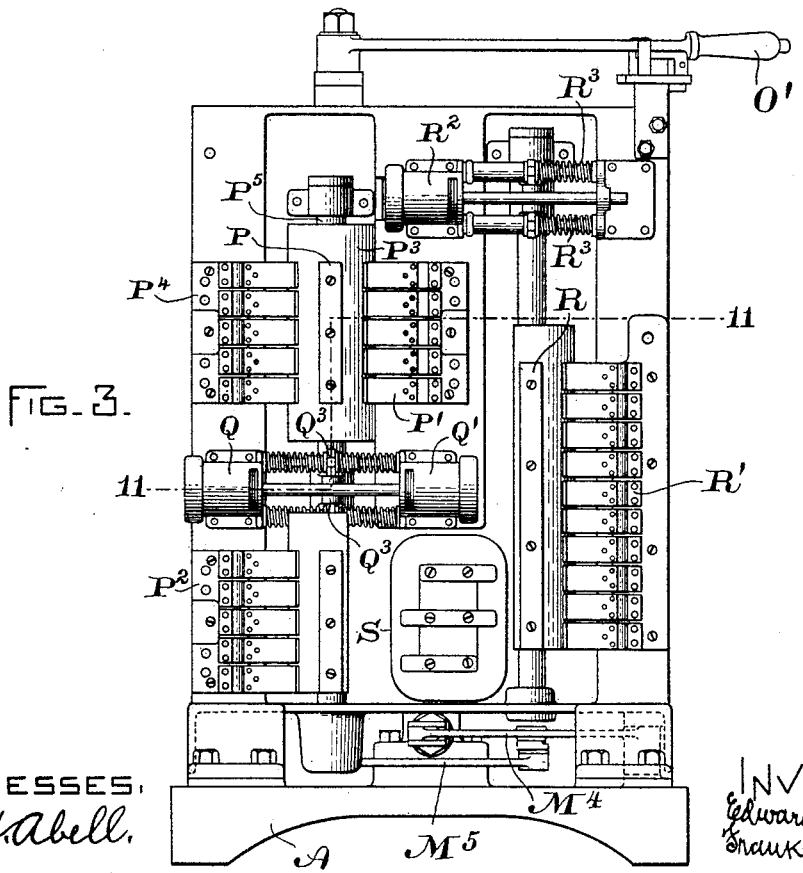

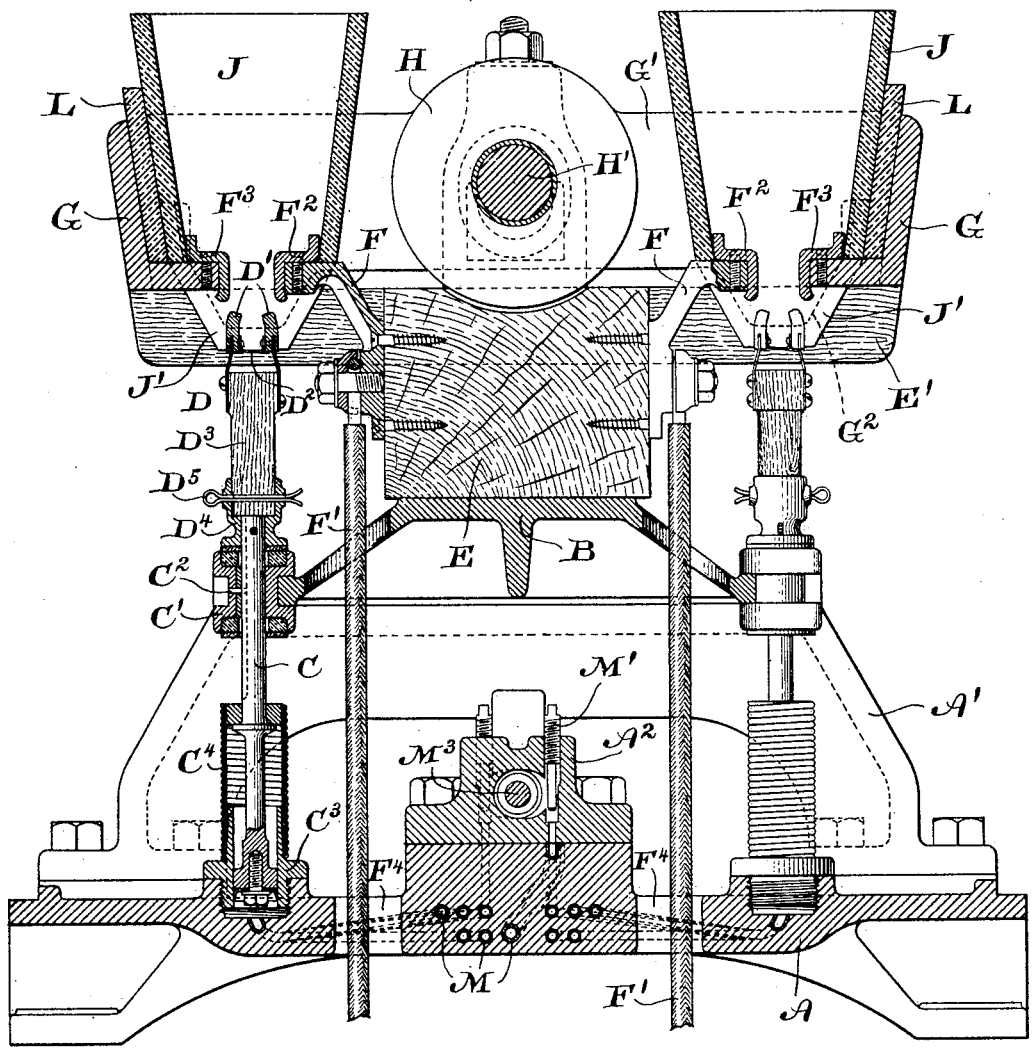

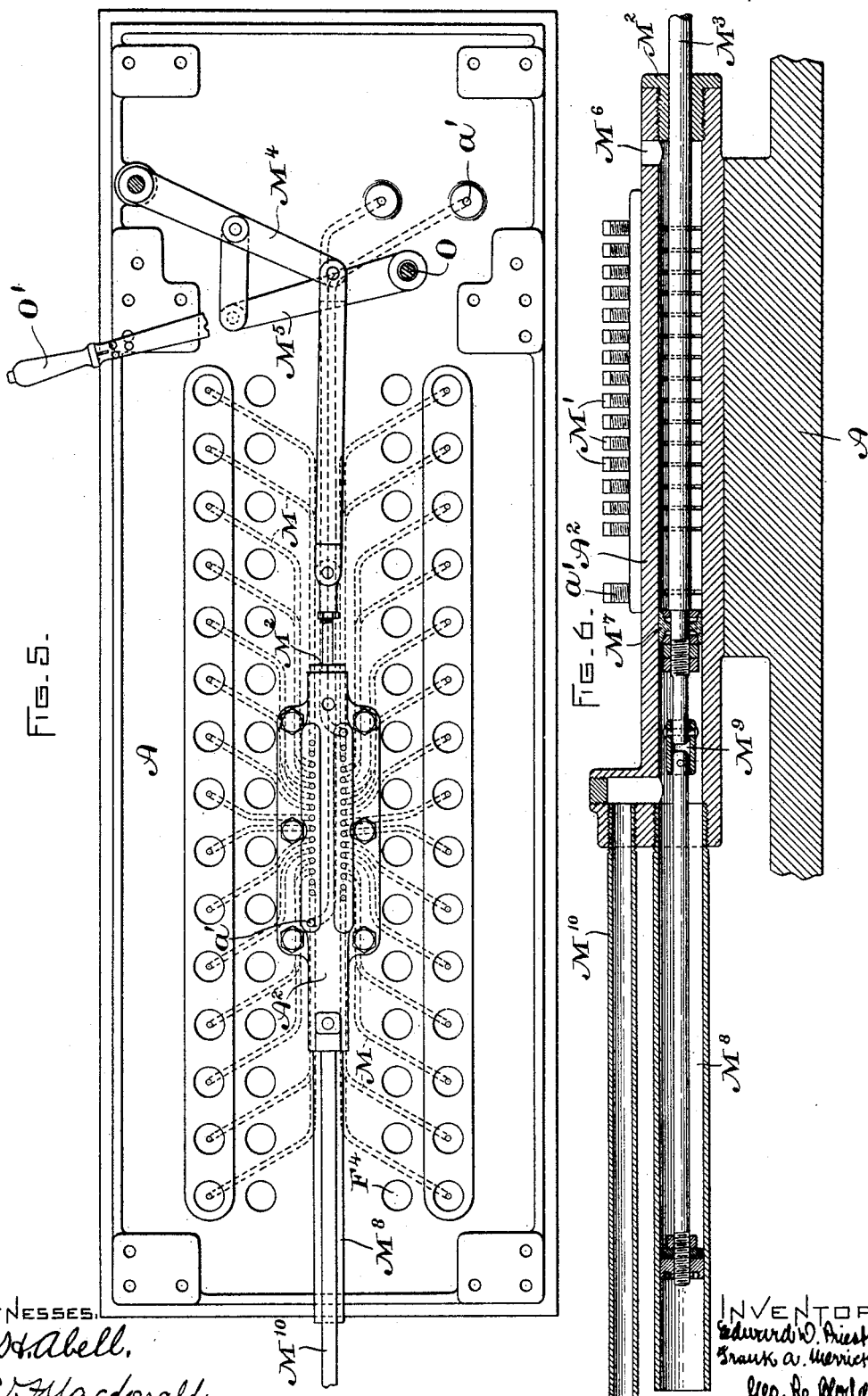

(No Model.) 6 Sheets—Sheet 5.

E. D. PRIEST & F. A. MERRICK.
PNEUMATICALLY ACTUATED CONTROLLER.

No. 583,939. Patented June 8, 1897.

WITNESSES:
A. H. Abell,
A. F. Macdonald.

INVENTORS
Edward D. Priest and
Frank A. Merrick, By
Geo. R. Blodgett,
Atty.

(No Model.)  6 Sheets—Sheet 6.

E. D. PRIEST & F. A. MERRICK.
PNEUMATICALLY ACTUATED CONTROLLER.

No. 583,939. Patented June 8, 1897.

WITNESSES.
A. H. Abell.
A. F. Macdonald.

INVENTORS.
Edward D. Priest and
Frank A. Merrick
Geo. R. Blodgett
atty.

UNITED STATES PATENT OFFICE.

EDWARD D. PRIEST AND FRANK A. MERRICK, OF SCHENECTADY, NEW YORK, ASSIGNORS TO THE GENERAL ELECTRIC COMPANY, OF NEW YORK.

PNEUMATICALLY-ACTUATED CONTROLLER.

SPECIFICATION forming part of Letters Patent No. 583,939, dated June 8, 1897.

Application filed September 28, 1896. Serial No. 607,162. (No model.)

*To all whom it may concern:*

Be it known that we, EDWARD D. PRIEST and FRANK A. MERRICK, citizens of the United States, residing at Schenectady, county of Schenectady, State of New York, have invented certain new and useful Improvements in Pneumatically-Actuated Controllers, (Case No. 225,) of which the following is a specification.

The present invention relates to pneumatically-actuated series-parallel controllers for electric motors which are adapted to connect the motors in series with a suitable resistance for starting, gradually reduce the resistance by including other resistances in multiple therewith, and finally short-circuit the resistance, leaving the motors in series; then reinsert the resistance, interrupt the circuit, change the motor connections from series to parallel, reëstablish the circuit, and cut out the resistance, in the same manner as described in connection with the series relation. Controllers of this class are known as "open-circuit" controllers in distinction from "bridge" controllers wherein the circuit is maintained with the one or more motors while changing from series to parallel.

Our invention has for one of its objects to do away with a large number of the contacts commonly employed in a series-parallel controller and at the same time to reduce the angular movement of the operating device. To accomplish this, the contact-steps of the resistance are arranged in such a manner that they have a double utility when changing from the slowest to the highest speed connections of the motors. A single operating-handle is employed. The first time it operates to cut out resistance from circuit with the motors, and as it returns to the "off" position the resistance is reinserted. A movement beyond the "off" position causes the handle to operate a switch for shifting the relation that the motors bear to one another, and as the handle passes the "off" position and reëstablishes the circuit the speed of the motors is changed, due to the shifting above referred to, and the speed is gradually increased as resistance is cut out.

A further object of the invention is to accomplish the changes outlined above by means of pneumatically-operated mechanism.

The invention also has for its object to provide separate and independent means for cutting the steps of resistance out of and into circuit with the motors, and also to provide means for automatically interrupting the circuit through any resistance-contact in case the actuating device at this particular point fails to work, and to accomplish this without interfering with the operation of the controller.

The invention further provides means for short-circuiting the operating resistances after the total resistance of the circuit has been reduced to a predetermined amount.

The invention also has for its object to so arrange the contact-actuating devices and switches that in case the supply of air fails the several parts are automatically returned to the "off" position, thus interrupting the circuit of the motors.

The invention has for its object to arrange the coils which energize the blow-out magnet in such a manner that any coil or coils may readily be removed without disturbing the remainder.

The invention also relates to the construction of the chutes, which are provided at each pair of resistance-contacts. These are so arranged that they are independently detachable, permitting the insertion of new ones in case of accident.

The invention also has for its object to provide a valve, which is actuated step by step by means of a device operated by the main operating-handle to supply the air for actuating the commutating-switch.

The invention also relates to details of construction, more fully described and claimed hereinafter.

In carrying out the invention a single operating-handle is employed, adapted to move to and fro, cutting resistance out of and into circuit with the motors by means of pneumatically-actuated pistons, each piston representing one resistance-step.

In addition to the above the handle actuates an auxiliary valve, which controls the switches for establishing the series and parallel relation of the motors, the handle and valve being so arranged that the first time the handle engages with the valve-actuating device the motors will be connected in series and the second time in parallel, alternating each time the handle is returned to a predetermined point. The series and parallel switches are mounted on a suitable support and are adapted to reciprocate from one set of contacts to another. These are actuated by pistons, and the supply of air for operating them is controlled by the auxiliary valve.

To extinguish the arcs formed when the series and parallel switches are thrown, a blow-out magnet, common to both, is provided. This has two pole-pieces hinged to the core, each carrying an arc-deflector adapted to restrain the arc in the proper direction. The blow-out magnet for the resistance-contacts is made of a number of separately-wound coils mounted on a common core. This core is supported at both ends, and to replace any coil which may be injured the core is released at the ends and withdrawn from the coils, the latter being supported from underneath as soon as the core is lowered. In addition to the blow-out magnet each resistance-contact is provided with a separate box or chute, and these are so arranged that they may readily be removed if injured.

Extending through the base are a number of small pipes, surrounded by the metal forming the base, having been placed in the mold before the metal was poured in. This presents a decided advantage in the construction, for it does away with a large number of small tubes or pipes which, if allowed to remain in an exposed place, are liable to injury, and, further, the liability to leakage due to joints and imperfections is greatly reduced. Each pipe leads from a suitably-balanced valve to a cylinder whose piston actuates a resistance-contact. By this construction the operation of each contact is entirely independent of the others, and in case the movable contact binds or welds with the stationary contacts a piece of soft metal, which forms a part of the movable contact-fuses, and the resistance-step, which was formerly connected thereby, is omitted, the balance of the apparatus working as before by reason of the multiple connection of the resistance-contacts.

The air for operating the pistons is obtained from a suitable reservoir, and each piston or contact device is provided with a spring arranged in such a manner that it will automatically return the piston or contact device to the "off" position as soon as the supply of air fails. The resistance of the circuit is decreased by including multiple resistance-paths in circuit therewith. It is decreased in this manner until it has reached a predetermined amount, after which a short-circuiting switch actuated by means of a suitable piston short-circuits the entire resistance and the motors are in direct connection with the source of supply.

In another application filed by Edward D. Priest the 18th day of September, 1896, bearing Serial No. 606,244, is shown and described a controller in which separately-actuated contacts are provided for varying the circuit relations of the motors. These contacts are actuated by means of pistons and cylinders, the supply of air therefor being regulated by suitable valve mechanism.

The present invention, while embodying certain of the features which are claimed in the above case, is intended by applicants to be subordinate thereto.

Figure 9:
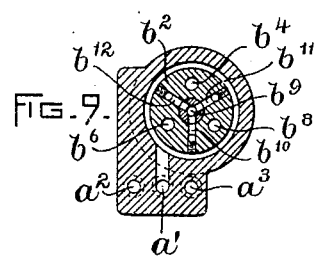
Figure 8:
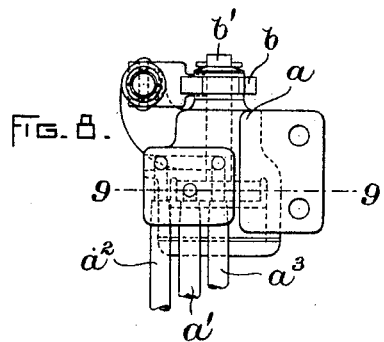
Figure 10:
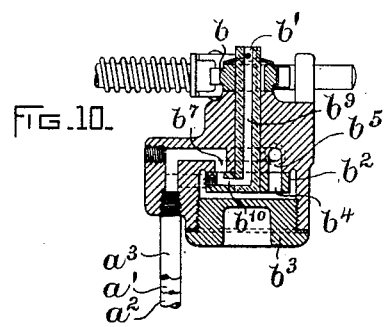
Figure 11:
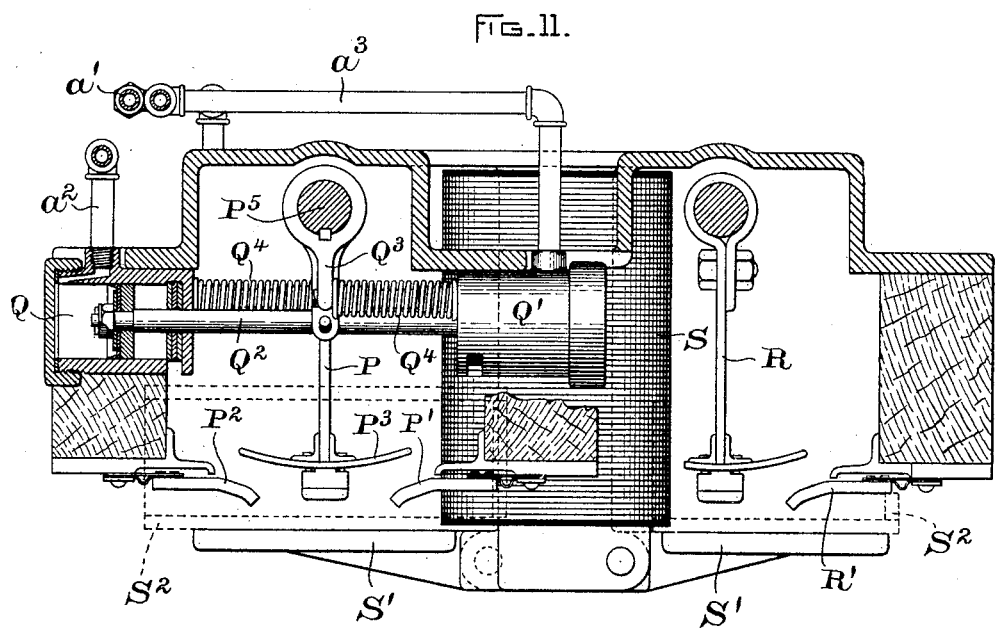
Figure 14:
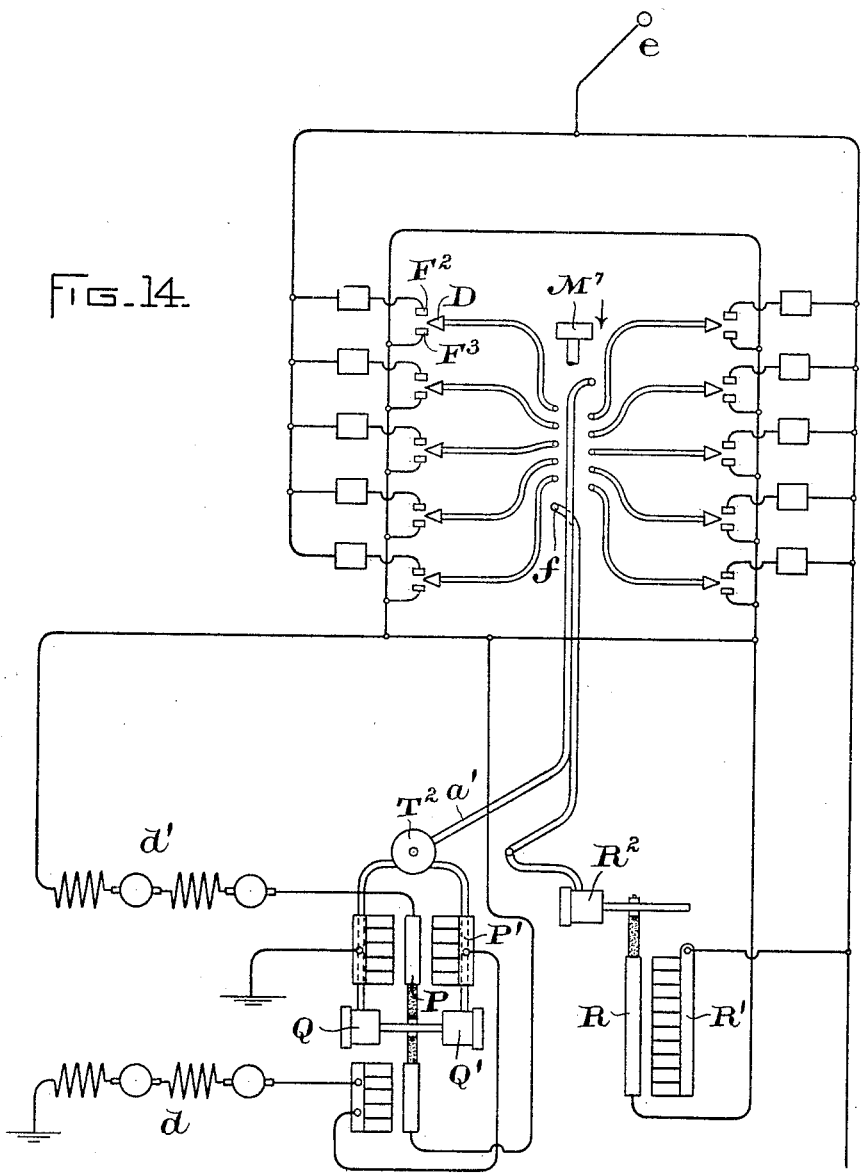

In the accompanying drawings, attached to and made part of this specification, Figure 1 is a side elevation of a controller, illustrating our invention. Fig. 2 is a partial plan view. Fig. 3 is a front end elevation with the pole-pieces and arc-deflectors removed. Fig. 4 is an enlarged cross-section on the line 4 4 of Fig. 1. Fig. 5 is a plan view of the base, showing the resistance-controlling valve and ports. Fig. 6 is a sectional view of the same. Fig. 7 is a detail view of the auxiliary valve. Figs. 8, 9, and 10 are details of the same. Fig. 11 is a sectional view taken on line 11 11 of Fig. 3 and shows the switches for changing the motors from series to parallel. Figs. 12 and 13 are detail views of the blow-out magnet-coils and support. Fig. 14 is a diagrammatic view of the circuit connections and operating mechanism.

Mounted on the base A are two supports A', to which is secured the secondary base B. This furnishes a support or bearing for the piston-rods C, which actuate the contacts D, carried thereby. In the present case there are thirty of these pistons and contacts, but the number can be varied to suit the requirements. Extending lengthwise of the base is a support E, made of wood, to which the contacts F are secured. These are connected by the leads F' to the resistance in any desired manner. On the ends of the support E are mounted pieces E', extending transverse thereto. These pieces form the support for the rectangular frame G, which forms a support for the contacts $F^3$, and at the same time electrically connects them together.

Extending parallel with the wooden piece E and just above it is an iron bar H', forming a core and support for the blow-out-magnet coils H. This bar is supported at the ends in a manner shown in Figs. 12 and 13. Secured to the cross-piece E' by suitable bolts is a casting $H^2$. This is provided with two projecting lugs forming a support for the eye-bolt I, the latter supporting the core H'. Extending transverse to the core H' and between the coils H are pieces G', which form the polar projections of the magnet. These are arranged with downwardly-extending projections $G^2$ (shown in dotted lines in Fig. 4) and are adapted to blow the arc upward, which is formed when the circuit is interrupted between the contacts $F^2$ and $F^3$. To remove a coil H, the nuts holding the eyebolts I are released, allowing the coils to rest on the wooden piece E. The core is then withdrawn and any coil may be replaced or repaired without disturbing the remainder.

Each contact is provided with a separate chute J. These are somewhat larger at the top than at the bottom and are provided with extensions J', which prevent the jumping of an arc from contact D to the next adjoining in a horizontal direction. The chutes are arranged to be readily removed in case of injury. Between them and the rectangular frame G are strips L, which serve as additional insulation.

The pieces F are mounted on the support E and form binding-posts for the leads F'. They also extend upward into the chute J and are provided with removable contact-tips $F^2$. On the opposite side of the chute is a corresponding tip $F^3$, mounted directly on the rectangular frame G, the latter being a conductor. All the contact-pieces $F^3$ are connected in multiple, and as one after the other of the circuits is closed by means of contact D, bridging the space between the contacts $F^2$ and $F^3$, the resistance is decreased until it reaches a predetermined amount. Then it is short-circuited by the switch R, Figs. 3, 11, and 14. The contact D is composed of two pieces D'. These are united by a strip of metal $D^2$, which is of sufficient capacity to carry the normal amount of current, but when an excess of current occurs, as would be occasioned if the moving and stationary contacts fused or stuck together, then the piece $D^2$ would fuse, and so far as the working of the balance of the apparatus is concerned it would have no effect other than to leave out that particular resistance-step. It is not intended that the pieces $D^2$ shall take the place of the regular circuit-breakers and fuses. They only serve to protect certain portions of the apparatus.

The contact D is carried by a wooden rod $D^3$, which is mounted in a socket $D^4$ and held therein by means of the cotter-pin $D^5$. This is to enable the contact D to be readily replaced in case of injury without disturbing other portions of the apparatus. The piston-rod C, upon which the socket $D^4$ is supported, is provided with a bearing C', secured to the secondary base B and provided with a projection $C^2$, which engages with a slot in the rod C to prevent the contact D from twisting out of line. On the end of the piston-rod is a head of any desired construction, and extending between a collar on the rod and the cylinder $C^3$ (the latter being provided with a thread and screwed into the base) is a spring $C^4$, which is extended each time the contact is forced upward, due to the air being admitted to the cylinder, and remains so until the supply of air is cut off from the cylinder, when it returns the piston and contact to the position shown in Fig. 4.

Figs. 4, 5, and 6 show the arrangement of the valve and its several parts. In the center of the base A is a thickened portion, in which the pipes or tubes M, leading from the cylinders to the valve, are placed. These pipes are made of any suitable material and are bent to the required shape and placed in the mold prior to the pouring in of the molten metal. By this construction the pipes are rigidly held in place, are protected against injury, and are subject to a minimum amount of leakage, due to imperfection in the joints. Each pipe extends upward, and corresponding holes are provided in the casting $A^2$, which is bolted to the base A. The central portion of $A^2$ is bored out to form a cylinder, and the opening thus formed connects with the passages leading to the several pipes M. To adjust the size of these openings, set-screws M', with extensions, are provided and are adapted to vary the opening of the port as they are screwed up or down. They also operate to cut out a port in case of injury to contacts D. On the right-hand end of the casting $A^2$ is a screw-threaded plug $M^2$, which forms a bearing for the rod $M^3$, the latter being connected to the lever $M^4$, pivoted to the frame and connected by a link to the lever $M^5$, which is secured to the lower end of the main actuating-shaft O, operated by means of the lever O'. Located in front of the plug $M^2$ is a hole $M^6$, forming the exhaust-port for the air which is released after the piston $M^7$ moves to the left. Extending outward to the left is a cylinder $M^8$. This is also provided with a piston, and the two pistons are connected together by a rod having a universal joint $M^9$. This joint compensates for any irregularity in the alinement of the two cylinders. Air is admitted under pressure from the pipe $M^{10}$, and as the pistons, by their arrangement, are balanced very little effort is required to operate the valve. In Fig. 5 the cylinders $C^3$ and their pistons have been removed to illustrate more clearly the arrangement of the valve and ports. The holes $F^4$ are to permit the leads F' to pass through to the resistance.

Figs. 2, 3, and 11 illustrate in detail the series-parallel and resistance short-circuiting switches. The series-parallel switch P is mounted on a shaft provided with suitable bearings and is adapted to reciprocate from contacts P' to $P^2$. The outer end of switch P is provided with a copper contact, and between it and the operating device is a piece of iron $P^3$, covered by mica or similar material and forming a part of the magnetic circuit through the pole S'. The contact-brushes P', $P^2$, and $P^4$ are mounted in vertical blocks of wood and are provided with suitable springs and stops for limiting their movement. Cylinders Q Q' are situated on the sides, and their pistons are connected together by means of the rod $Q^2$. Keyed to the shaft $P^5$ are arms $Q^3$. These are in engagement with the springs $Q^4$, which are so arranged that they return the switch P to the position shown in the figures as soon as the air is cut off from either of the cylinders. The resistance short-circuiting switch R is adapted to engage with one set of brushes R'. These are connected in circuit in such a manner that when the blade R is in engagement with the brush R' the resistance of the circuit is short-circuited. This short-circuiting is the last step or running position before changing from series to parallel, and is again the last step when the motors are in parallel. As this switch operates only on one set of contacts, a single cylinder $R^2$ is used, provided with a piston for closing the circuit and with a spring $R^3$ for opening the circuit after the air-pressure has been relieved. To blow out the arc formed when the circuit is interrupted, an energizing-coil S is mounted on a core which is cast integral with the back of the frame. Pivoted to the core are two pole-pieces S'. To these are secured arc-deflectors $S^2$, adapted to be swung outward to permit inspection of the contacts.

Figs. 7, 8, 9, and 10 are detail views of the auxiliary valve. O is the main operating-shaft of the controller. Secured to this is an arm T, which in certain positions of the operating-handle O' is in engagement with the plunger T', which actuates the valve $T^2$ through the medium of a ratchet and pawl $T^3$. The ratchet has six teeth, and each time the plunger T' is forced inward, compressing the spring $T^4$, the ratchet advances one step. The valve $T^2$ is composed of a casing $a$, provided with three openings—the middle one for the inlet-pipe $a'$, leading from the valve in the base A', the left-hand one $a^2$ for the series switch-cylinder, and the third one $a^3$ for the multiple switch-cylinder. The ratchet $b$ is fixed to the end of the shaft $b'$, which is provided at its inner end with a disk $b^2$, having three holes therein. These are adapted at intervals to coincide with the ports leading to the cylinders Q Q'. For example, the air enters by inlet-pipe $a'$ as soon as the piston $M^7$ moves beyond its opening in the casting $A^2$, passes to the chamber surrounding the disk $b^2$, and is prevented from escaping by means of the screw-threaded plug $b^3$. Thence it passes upward through the hole $b^4$ of the disk, coinciding in the present position with the opening $b^5$, which leads to the pipe $a^2$ and the series switch-cylinder Q. When the air-pressure is relieved by moving the piston $M^7$, Fig. 6, to the left beyond the opening $a'$, the air is permitted to escape to the atmosphere through the opening $M^6$ and the switch P is returned to the position shown by means of the spring $Q^4$. There being three openings in the disk $b^2$ and two ports leading outward, with a six-tooth ratchet actuating the valve, the next movement of the plunger T' would advance the valve-disk one-sixth of a revolution. This would close the port $b^5$, for the hole $b^4$ in the disk would no longer coincide, but the hole $b^6$ would have advanced until it was opposite the opening $b^7$, which leads to the pipe $a^3$ and the multiple switch-cylinder. The next movement, consisting of one-sixth of a revolution, would bring the hole $b^8$ to a position coinciding with the position of the hole $b^4$, (shown in the drawings,) and air would again be admitted to the series switch-cylinder. Air is received from a suitable source of supply by means of the pipe $M^{10}$, which opens into a chamber formed by the cylinder $M^8$. The piston $M^7$ being between the source of supply and the auxiliary valve $T^2$, it controls the air thereto, and the port $a'$, opening into the cylinder $A^2$, exhausts through the opening $M^6$. In addition to the exhaust through the opening $M^6$, as previously described, a secondary system is provided. Extending upward through the shaft $b'$, Figs. 9 and 10, is an opening $b^9$, which is open to the atmosphere. Holes $b^{10}$, $b^{11}$, and $b^{12}$ are located in the disk $b^2$ and connect with the opening $b^9$ by suitable passages. These holes are so arranged that as the disk is rotated they will at intervals coincide with the ports $b^5$ and $b^7$, permitting the air from the cylinders to escape to the atmosphere. This secondary system prevents the pocketing of air in the cylinders Q, Q', and $Q^2$ when the commutating is quickly performed, which if allowed to escape slowly would retard the action of the switches R and P.

Referring to Fig. 2, the operation will be described. The sector C is provided with a suitable number of notches, each notch indicating one step in the controller. $c'$ is the first notch of the resistance-steps. The handle as shown is in the "off" position. As it is moved toward the front end of the controller air is admitted to either the series or parallel switch-cylinder through the auxiliary valve $T^2$, depending upon which position it occupies. Assuming that the valve is set for the series cylinder Q and it is desired to set it for the multiple cylinder Q', the handle O' is forced backward until it reaches the pin $c^2$. This will cause the arm T, mounted on the same shaft as the handle O', to force the plunger against the spring $T^4$ and advance the ratchet $b$ ahead one notch, which will establish a connection between the inlet-pipe and the multiple switch-cylinder, and air will be admitted thereto while the operating-handle moves from the "off" position to the notch $c$ and establishes a multiple relation of the motors. As the handle is moved to and from the "off" position resistance is cut out of and into circuit with the motors by reason of the contacts D making and breaking circuit with the contacts $F^2$ and $F^3$. This has no effect on the relation of the motors, for that is controlled by the auxiliary valve $T^2$; but each time the handle O' is moved backward until it strikes the pin $c^2$ a new circuit relation of the motors will be established when the handle passes the "off" position, moving toward the front of the controller, and thus completes the circuit. The resistance of the circuit will be reduced step by step as the handle O' is advanced, and when the handle reaches the notch $c^3$ air will be admitted by means of the main valve to the cylinder R², and the switch R will be thrown to the left and engage with the contacts R' and short-circuit the resistance.

In Fig. 14 is shown a diagrammatic view of the circuit connections and the cylinders for operating the switches. The motors are shown as connected in pairs $d$ and $d'$ and in circuit with the brushes P² and the movable switch-contact P. When the piston M⁷ is advanced, it first admits air to the port on the right. This is connected with the inlet-pipe $a'$ of the auxiliary valve T², and if this valve is set for the series position of the switch P air will be admitted to the cylinder Q and its piston will force the switch P to the right and into engagement with the brushes P', which connect the group of motors $d$ and $d'$ in series. Current is received from the trolley $e$, and as soon as the contacts D are forced into engagement with the stationary contacts F² and F³ the circuit is established with a certain amount of resistance. This resistance is gradually reduced by moving the piston in the direction of the arrow, which admits air to the cylinders C³, and the contacts D include multiple resistance-paths in circuit. These paths are added to the circuit one by one until the resistance is very low, when the piston M⁷ reaches the port $f$ and air is admitted to the cylinder R², which forces the contact R into engagement with the brushes R' and the resistance is short-circuited. The action is the same each time the circuit is closed, the position of the valve T² determining whether the motors are connected in series or parallel.

What we claim as new, and desire to secure by Letters Patent of the United States, is—

1. In a controller, the combination of a valve, means for operating the valve, and contacts controlled by the valve for establishing various motor combinations, the relation of the valve and operating mechanism being such that the first time the operating mechanism is brought to a predetermined position, one relation of the motors is established, and the next time a different relation.

2. In a controller, the combination of an operating device, a valve controlled thereby, contacts for varying the resistance of the circuit, and an independent auxiliary valve for establishing different motor combinations, actuated by the handle at intervals.

3. In a controller, the combination of an operating device, a valve controlled thereby, means for varying the resistance of the circuit, an independent auxiliary valve, means controlled thereby for establishing different motor combinations, and means for imparting a step-by-step motion to the auxiliary valve.

4. In a pneumatic controller, the combination of a valve, contacts for regulating the resistance of the circuit, a commutating-switch, an auxiliary valve controlling the operation of the commutating-switch, and an operating mechanism for the valves, bearing such a relation to the working parts that it establishes a certain relation of the motor-circuits the first time it is moved to a predetermined position, and a different relation the next time it is moved to the same position.

5. In a pneumatic controller, the combination of a reciprocating valve mechanism, contacts controlled thereby for regulating the resistance of the motor-circuit, a rotary valve mechanism, and contacts controlled thereby for establishing different motor combinations.

6. In a pneumatic controller, the combination of a reciprocating valve mechanism, a plurality of separately-actuated contact devices controlled thereby, an auxiliary valve actuated at a certain predetermined position of the operating-handle, and a switch controlled thereby for establishing a series or parallel relation of the motor-circuits.

7. In a controller provided with a single operating-handle, the combination of a plurality of pneumatically-operated contact devices adapted to vary the resistance of the circuit when the motors are connected in series, and a switch-contact controlled by the handle for simultaneously closing the circuit of a number of contacts when it is desired to establish a new relation of the motor-circuits.

8. In a pneumatic controller, the combination of a plurality of separately-actuated resistance-contacts, pistons and cylinders for operating the contacts, and a switch-contact for simultaneously closing the circuit of a plurality of stationary contacts.

9. In a controller, the combination of a main valve for regulating the admission of air to the resistance-contact cylinders, a series-parallel switch provided with a contact for simultaneously closing the circuit of a plurality of stationary contacts, means for operating the switch, an independent auxiliary valve for controlling the means, and a handle for operating the main and auxiliary valves.

10. In a pneumatic controller, the combination of a resistance, a plurality of separately-actuated resistance-contacts, a switch provided with a contact for short-circuiting the resistance at a predetermined point by simultaneously closing the circuit of a plurality of stationary contacts, and a valve controlled by the actuating-handle of the controller for regulating the operation of the contacts and the short-circuiting switch.

11. In a controller, the combination of a pneumatically-actuated switch for coupling the motors in series, separate pneumatically-actuated contacts for closing the circuit and reducing the resistance, a valve for regulating the operation of the contacts, a switch for short-circuiting the resistance, a switch for shifting the motor connections from series to parallel, and pneumatically-actuated contacts for reducing the resistance of the circuit.

12. In a controller, the combination of separate contacts pneumatically actuated for varying the resistance of the circuit, a switch for establishing a series or parallel relation of the motors, and a switch adapted to short-circuit the resistance each time it is reduced to a predetermined amount.

13. In a blow-out magnet, the combination of a core energized by a plurality of separately-removable coils, and means at the ends of the core for lowering it to remove the coils.

14. In a controller the combination of a base to which a plurality of resistance-cylinders are secured, an auxiliary base supporting the contacts and blow-out magnet, bearings on the auxiliary base for the resistance-contacts, and a valve mounted on the base of the controller for regulating the admission of air to the cylinders.

15. In a controller the combination of a plurality of energizing-coils for a blow-out magnet, a removable core for the magnets having end supports, and a base to which the end supports are secured, adapted to form a support for the coils when the core is removed.

16. In a controller, the combination of a rectangular frame supported by the base, contacts secured to the frame, other contacts secured to the base, and a separate removable chute for each pair of contacts.

17. In a controller, the combination of an open-ended cylinder, a piston working in the cylinder, a spring for returning the piston to place after the air-pressure has been relieved, and a contact device operated by the piston and removably secured thereto.

18. In a controller, the combination of a base, pipes surrounded by the metal forming the base, and a valve for controlling the air which passes through the pipes.

19. In a controller, the combination of a plurality of stationary contacts, separately-operated contacts engaging therewith, and means for cutting out individual contacts without interfering with the operation of the controller.

20. In a pneumatic controller, the combination of a switch-blade, pistons and cylinders for positively actuating it situated on both sides of its center or "off" position, and springs for returning it to the "off" position when the air-pressure is relieved.

21. In a pneumatic controller, the combination of a valve adapted to regulate the supply of air to the commutating-switches, an operating-handle, and means actuated by the handle for imparting a step-by-step rotary movement to the valve.

22. In a pneumatic controller the combination of a valve, a ratchet for operating the valve, a pawl, mounted on a spring-pressed rod and engaging therewith, and an arm forming an extension of the handle adapted to operate the valve.

23. In a controller, the combination of two stationary contacts, a movable contact adapted to bridge the space between the stationary contacts, comprising two conducting-pieces mounted on an insulating-support and connected by a piece of fuse metal, a piston to which the movable contact is secured, and a cylinder in which the piston is mounted.

24. In a pneumatic controller, the combination of a valve, contacts controlled by the valve for varying the motor-circuit, and means for imparting a step-by-step movement to the valve.

25. In a pneumatic controller, the combination of a valve, contacts controlled thereby for establishing a series or parallel relation of the motors, and means for imparting a rotary step-by-step movement to the valve.

26. In a pneumatic controller, the combination of a rotary valve, contacts controlled thereby, means for imparting a rotary movement to the valve, a reciprocating valve, contacts controlled thereby, and means for imparting a reciprocating motion to the valve.

27. In a pneumatic controller, the combination of a plurality of separately-actuated contacts, pistons and cylinders for operating the contacts, a fuse mounted on each contact, and a valve for regulating the movement of the contacts.

28. In a pneumatic controller, the combination of a valve, a plurality of ports leading from the valve, a plurality of pistons controlled thereby, and means for closing a port or ports when it is desired to prevent a piston or pistons from operating.

29. In a pneumatic controller, the combination of a valve, a plurality of ports leading from the valve, a plurality of resistance-contacts controlled by the valve, a valve-actuating device, and set-screws adapted to regulate the opening from the valve to the ports.

30. In a pneumatic controller, the combination of a valve, contacts controlled thereby, a cylinder secured to a suitable base, a piston mounted for movement in the cylinder, contacts mounted on the piston, and a spiral spring surrounding the piston and secured at one end to a collar on the piston and surrounding and secured at the other end to the cylinder.

In witness whereof we have hereunto set our hands this 25th day of September, 1896.

EDWARD D. PRIEST.
FRANK A. MERRICK.

Witnesses:
B. B. HULL,
A. F. MACDONALD.